US011303811B2

(12) United States Patent
    Stec

(10) Patent No.: US 11,303,811 B2
(45) Date of Patent: Apr. 12, 2022

(54) EVENT-SENSOR CAMERA

(71) Applicant: FotoNation Limited, Galway (IE)

(72) Inventor: Piotr Stec, Galway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 16/674,378

(22) Filed: Nov. 5, 2019

(65) Prior Publication Data

US 2021/0136288 A1    May 6, 2021

(51) Int. Cl.
    *H04N 5/345*     (2011.01)
    *H04N 5/232*     (2006.01)
    *G02B 27/64*     (2006.01)
    *H04N 5/225*     (2006.01)

(52) U.S. Cl.
    CPC ....... *H04N 5/23287* (2013.01); *G02B 27/646* (2013.01); *H04N 5/2254* (2013.01); *H04N 5/3454* (2013.01); *H04N 5/3456* (2013.01)

(58) Field of Classification Search
    None
    See application file for complete search history.

(56) References Cited

U.S. PATENT DOCUMENTS

| | | | | |
|---|---|---|---|---|
| 9,189,451 | B1* | 11/2015 | Freedman | B64G 1/68 |
| 10,948,341 | B2* | 3/2021 | Petty | G01J 1/0403 |
| 2004/0263681 | A1* | 12/2004 | Teramoto | H04N 7/183 |
| | | | | 348/375 |
| 2009/0297039 | A1* | 12/2009 | Reinpoldt, III | G06T 7/11 |
| | | | | 382/209 |
| 2016/0370688 | A1* | 12/2016 | Ishimatsu | G02B 27/286 |
| 2017/0140509 | A1* | 5/2017 | Lee | H04N 5/23264 |
| 2017/0198747 | A1* | 7/2017 | Chen | H04N 5/2328 |
| 2019/0014258 | A1* | 1/2019 | Horesh | H04N 5/2351 |
| 2020/0249080 | A1* | 8/2020 | Petty | H04N 5/2259 |
| 2020/0301096 | A1* | 9/2020 | Honjo | G03B 13/34 |

(Continued)

FOREIGN PATENT DOCUMENTS

| | | |
|---|---|---|
| EP | 3440833 B1 | 8/2019 |
| WO | 2019145516 A1 | 8/2019 |
| WO | 2019180033 A1 | 9/2019 |

OTHER PUBLICATIONS

A. Beninati et al., "Space Target Motion Salient Classification using Polarimetric Retina Vision Sensing Principles," 2018 IEEE International Conference on Imaging Systems and Techniques (IST), Krakow, 2018, pp. 1-5, doi: 10.1109/IST.2018.8577175. (Year: 2018).*

(Continued)

*Primary Examiner* — Jason A Flohre
*Assistant Examiner* — Wesley J Chiu
(74) *Attorney, Agent, or Firm* — Lee & Hayes, P.C.

(57) ABSTRACT

A camera comprises a lens assembly coupled to an event-sensor, the lens assembly being configured to focus a light field onto a surface of the event-sensor, the event-sensor surface comprising a plurality of light sensitive-pixels, each of which cause an event to be generated when there is a change in light intensity greater than a threshold amount incident on the pixel. The camera further includes an actuator which can be triggered to cause a change in the light field incident on the surface of the event-sensor and to generate a set of events from a sub-set of pixels distributed across the surface of the event-sensor.

16 Claims, 3 Drawing Sheets

(56) References Cited

U.S. PATENT DOCUMENTS

2020/0410272 A1* 12/2020 Seo .................. G06K 9/6279
2021/0041712 A1* 2/2021 Bilik .................. G02B 3/0006

OTHER PUBLICATIONS

International Searching Authority, PCT International Search Report and Written Opinion for PCT Application No. PCT/EP2020/073928 filed on Aug. 27, 2020, Report dated Nov. 13, 2020, 14 pages.

Lohr Maximilian P R et al: "Contrast Detection in Event-Streams from Dynamic Vision Sensors with Fixational Eye Movements", 2018 IEEE International Symposium on Circuits and Systems (ISCAS), IEEE, May 27, 2018 (May 27, 2018), pp. 1-5, XP033434531, DOI: 10.1109/ISCAS.2018.8351084.

Clara Callenberg et al: "Snapshot Difference Imaging using Time-of-Flight Sensors", Arxiv.org, Cornell University Library, 201 Olin Library Cornell University Ithaca, NY 14853, May 19, 2017 (May 19, 2017), XP080949011.

Posch, C, Serrano-Gotarredona, T., Linares- Barranco, B., & Delbruck, T. "Retinomorphic event-based vision sensors: bioinspired cameras with spiking output", Proceedings of the IEEE, vol. 102( No. 10), 1470-1484, (Oct. 2014).

* cited by examiner

EVENT-SENSOR CAMERA

FIELD

The present invention relates to an event-sensor camera.

BACKGROUND

Imaging with conventional cameras uses a frame-based approach, in which all pixels in an image sensor measure the light falling upon them for a given period of time and report their values to image processing circuitry in a synchronous manner.

Cameras based on event-sensors such as disclosed in Posch, C, Serrano-Gotarredona, T., Linares-Barranco, B., & Delbruck, T. "Retinomorphic event-based vision sensors: bioinspired cameras with spiking output", Proceedings of the IEEE, 102(10), 1470-1484, (2014), European Patent No. EP3440833, PCT Application WO2019/145516 and PCT Application WO2019/180033 from Prophesee are based on asynchronously outputting image information from individual pixels whenever a change in pixel value exceeds a certain threshold—an event.

Event-sensors work well in scenes with very high dynamic ranges, i.e. with large differences in pixel illumination across a scene being imaged and can achieve very high temporal resolution allowing such sensors to track very fast-moving objects in various illumination conditions.

One disadvantage of event-sensor based cameras is that when there isn't sufficient change or movement in a scene being imaged, the camera can become blind in the corresponding regions of an image. Indeed, unless there is movement across a scene being imaged or the camera is moved, it isn't possible to readily obtain a complete image of a scene with such cameras.

SUMMARY

According to the present invention there is provided an event-sensor camera according to claim 1.

In some embodiments, an optical image stabilisation (OIS) type actuator is incorporated within a camera module including an event sensor and this can be triggered when a static or apparently static scene, i.e. a scene where changes are so slow that events are not generated, is being imaged to generate events when the camera is not moving or the scene is not changing, so allowing the camera to produce an image for a static scene.

In alternative embodiments, a polarization layer is incorporated within the light path and is actuated to change the polarization axis of the layer and so change the light field incident on the event-sensor.

Other embodiments use still further variations of actuator or combinations of actuators for changing the light field incident on the event-sensor.

BRIEF DESCRIPTION OF THE DRAWINGS

Embodiments of the invention will now be described, by way of example, with reference to the accompanying drawings, in which.

DESCRIPTION OF THE EMBODIMENTS

Figure 1:
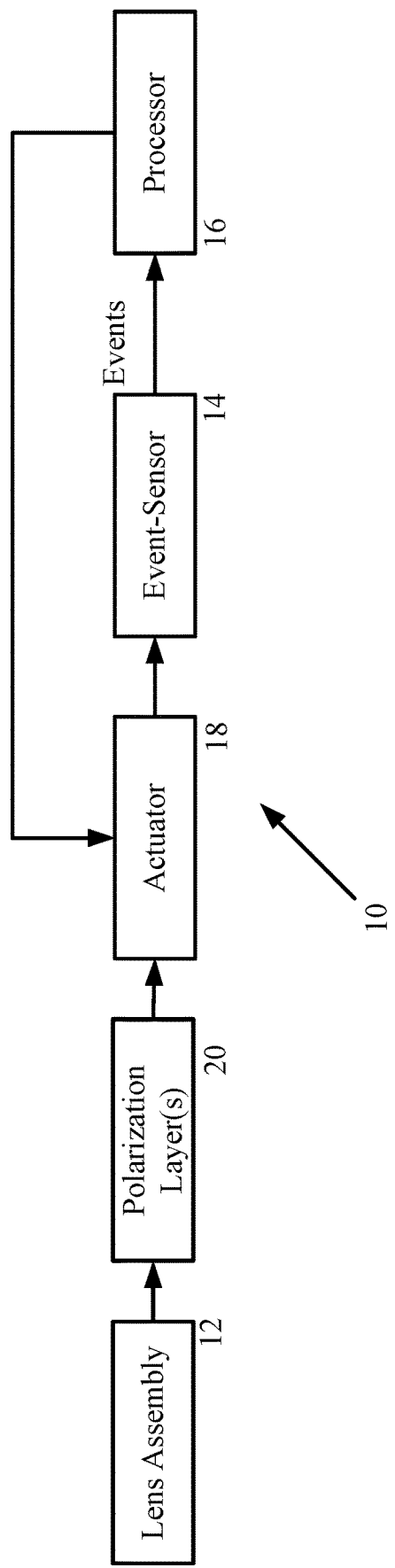
FIG. 1 illustrates schematically a camera according to an embodiment of the present invention.

Referring now to FIG. 1 there is shown schematically a camera 10 according to an embodiment of the present invention. The camera 10 comprises a lens assembly 12 which can be conventional unless where otherwise explained below. The lens assembly 12 is coupled to an event-sensor 14, for example, of the type referenced above from Prophesee. The event-sensor 14 comprises an array of pixels (not shown) each of which can generate an event in response to a change in light intensity greater than a threshold amount in a given period of time. As will be appreciated, these events can occur at any given time and are then communicated across a bus to a processor 16 for further processing. In some cases, event information can be written to memory (not shown) and read from memory by the processor 16.

As mentioned, the event information provided by the sensor 14 can be sparse spatially and/or temporally depending on the amount of change within a scene being imaged and this may prevent the processor 16 from ever assembling a complete image of a scene or an image of a static portion of a scene.

Other problems can arise if, for example, the processor 16 is relying on image information for Visual Simultaneous Location and Mapping (VSLAM) as the calculated camera pose and location may drift away from the actual camera position when there is no information coming from the camera, even in a relatively short time.

In a first embodiment of the present invention, the camera includes an actuator 18 of the type employed in lens systems for optical image stabilisation (OIS). Typically, such actuators comprise an open rectangular frame which sits between the lens assembly 12 and a sensor holder. Either a processor such as the processor 16 or a dedicated OIS processor is connected to an inertial measurement unit (IMU) comprising a gyroscope and/or one or more accelerometers and the processor responds to camera movement detected during the acquisition of an image to cause counter movements in the actuator, so shifting the lens assembly relative to the sensor in order to maintain a sharp image in spite of camera movement during image acquisition. (Clearly such an OIS actuator has no application in a typical event-sensor based camera as there is no fixed period during which an image is being acquired and where it would be desirable to maintain a constant light field incident on the event-sensor 14.)

In the present embodiment, however, the processor 16 can at any time cause the actuator 18 to move sufficiently to cause the entire light field incident on the event-sensor 14 to change—in this case to shift. This will cause a change in light intensity at any pixels located close to any edges in the light field incident on the event-sensor 14. Where these changes are greater than the threshold amount set for the event-sensor 14, events will be generated by the relevant pixels and provided to the processor 16.

Figure 2:
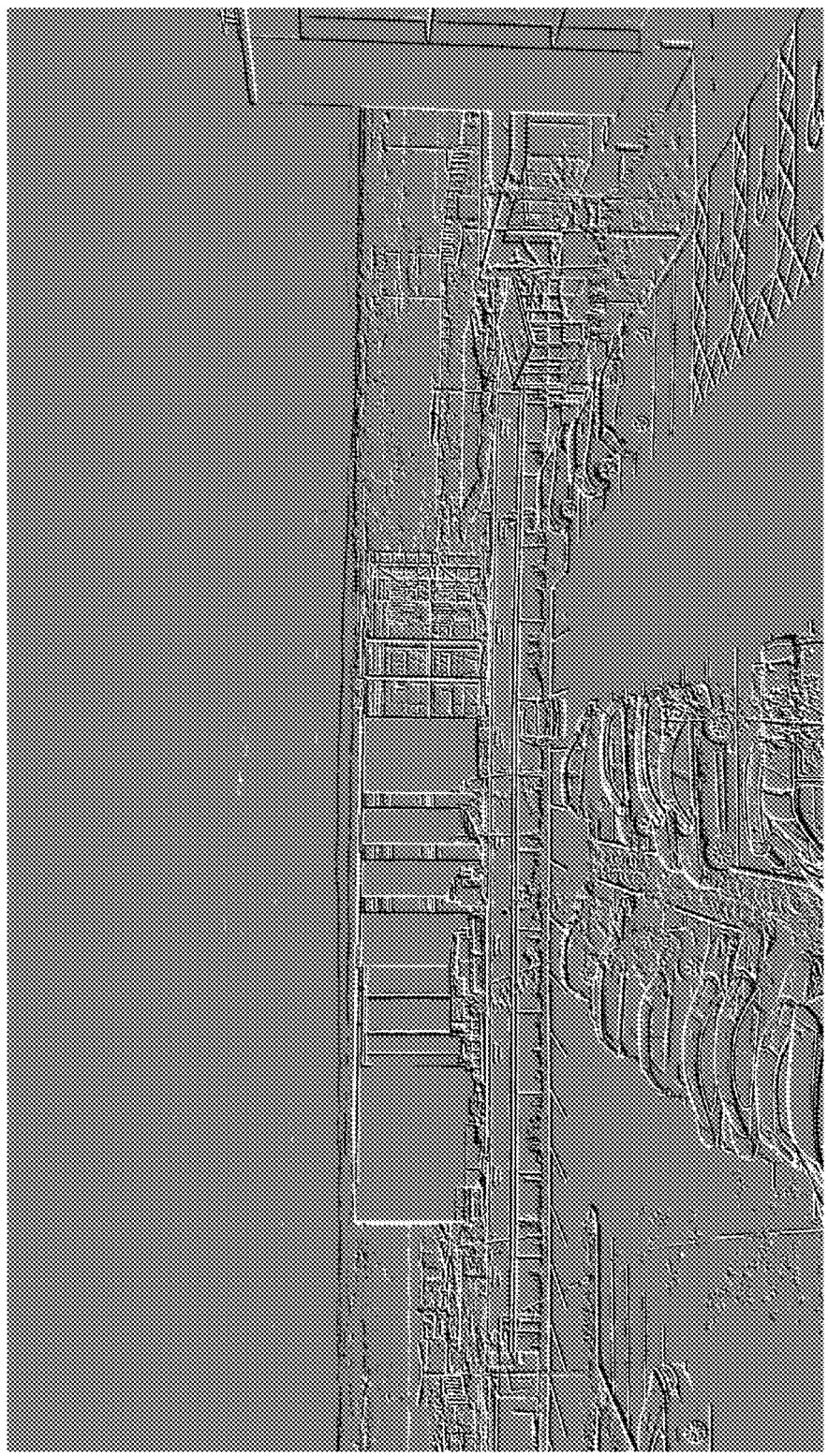
FIG. 2 illustrates an exemplary image produced by a camera according to one embodiment of the present invention.

So with reference to FIG. 2, where a static scene such as a car park in this case is being imaged, moving the lens 12 relative to the event-sensor 14 through the OIS actuator 18 generates a set of events from a sub-set of pixels distributed across the event-sensor 14 which can then be assembled to generate an edge based view of the scene—where the event-sensor 14 might otherwise not have been providing much if any information to the processor 16.

Note that as events are thus typically only generated for pixels at edges in the light field, the number of events generated by triggering the actuator 18 is still relatively small by comparison to for example, a complete frame for a typical image sensor. Thus, even though the bus or any communication path between the event-sensor 14 and processor 16 is typically designed to handle limited traffic, this need not be overwhelmed by the event information generated in response to the driving of the actuator 18 by the processor 16.

This actuation can be triggered in a number of ways including periodically or in response to a frequency of event information provided by the event-sensor 14 dropping below a threshold level or even the frequency of event information for one or more regions of the event-sensor dropping below a threshold level or based on any other criteria. Thus, for example, if the processor 16 has not seen movement from one or more regions of the event-sensor within a given time, it can trigger the actuator 18. Alternatively, the processor 16 can choose to trigger the actuator 18 when it might otherwise be idle.

Many variants of the above described embodiment are possible, in particular, there are numerous techniques available for changing the light field from the lens assembly 12 incident on the event-sensor 14.

In a typical OIS actuator, triggering of the actuator 18 causes the lens assembly 12 to move orthogonal to the optical axis, whereas it will be appreciated, the invention could work equally well if this movement comprised any of pitch, yaw or roll of the lens assembly 12 relative to the optical axis.

Alternatively, rather than changing the alignment of the lens assembly 12 relative to the event-sensor 14, it could also be possible to mount the event-sensor 14 so that it could be moved relative to the incident light field. This might simply require the event-sensor 14 to be mounted where it could be shifted orthogonally in one or more directions relative to the optical axis.

It is also possible to use an actuator to move the entire camera to cause the light field incident on the event-sensor 14 to change, however, in this case, the number of events generated by the event-sensor 14 would be dependent on the distance between any objects within the field of view and the camera due to parallax effect.

Other possible techniques for changing the light field incident on the event-sensor 14 include using a zoom lens and changing the focal length sufficiently to cause a change in magnification sufficient to generate a radial change in the light field incident on the event-sensor 14 and again generate event information for pixels close to edges in the light field.

Another possibility whether using a zoom lens or not, is to change focus sufficiently that details around edges move in or out of focus, thus causing a change in light intensity and so triggering events from pixels distributed across the event sensor 14.

It will be appreciated that since the change in light field caused by the above described actuators is predictable and measurable, it is possible to separate scene and object motion even from a set of events generated simultaneously in response to triggering the actuator 18.

Still further possibilities which can be employed include providing one or two polarization layers 20 located in the light path in front of the lens or anywhere between a front surface of the lens assembly 12 and the imaging surface of the event-sensor 14. The axis of polarization of such a polarization layer can be changed either by a mechanical or electrical actuator and by triggering such an actuator, the light field incident on the event-sensor can be changed.

Figure 3:
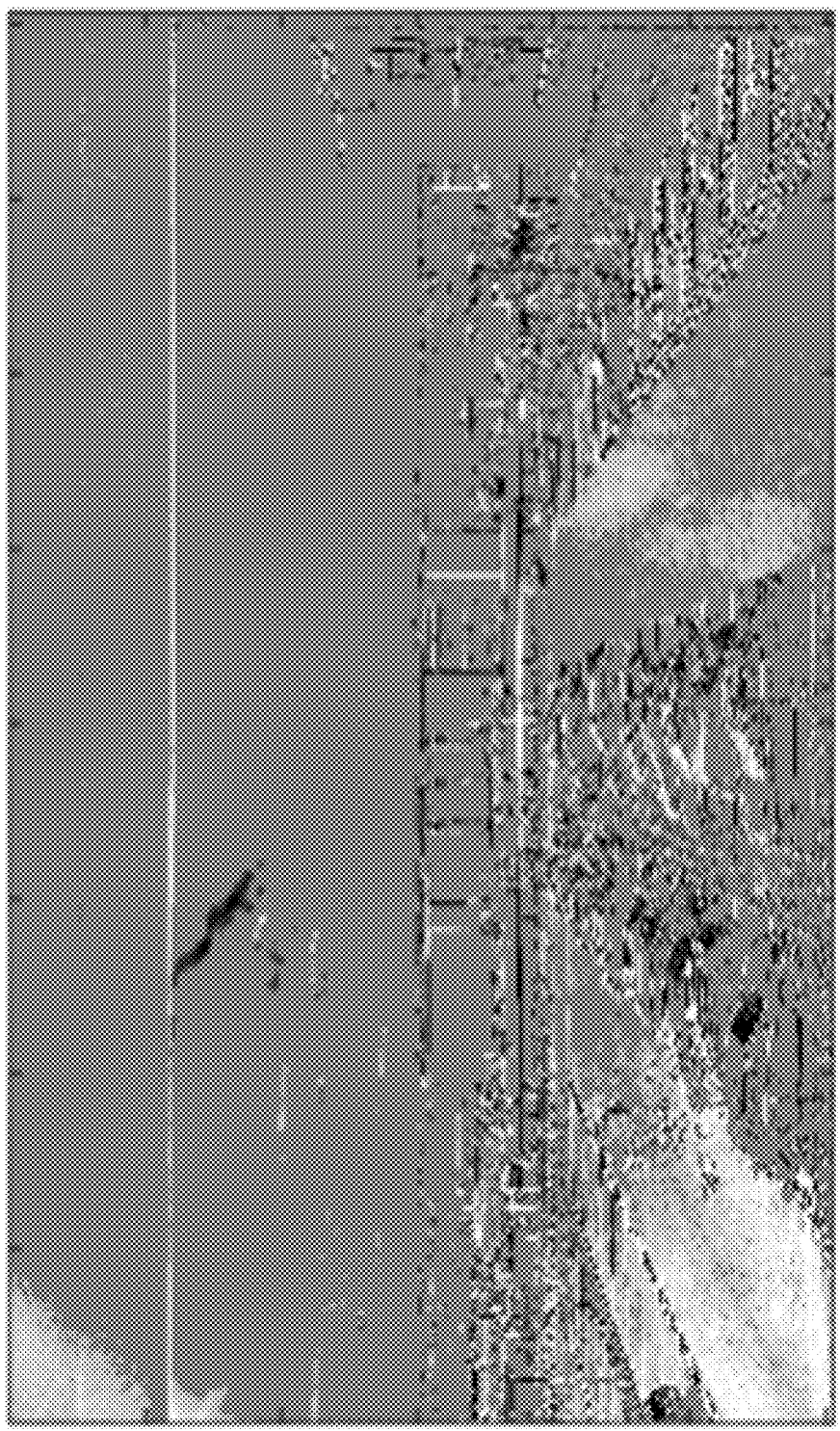
FIG. 3 illustrates another exemplary image produced by a camera according to another embodiment of the present invention.

Referring to FIG. 3, the quality of image information produced by changing the axis of polarisation of a polarization layer, by comparison to embodiments which involve mechanically changing the state of the lens assembly 12 or the relative alignment of the lens assembly 12 and event-sensor 14, can differ and is more likely to produce image information from within surfaces in a scene being imaged. This is because dielectric surfaces polarize reflected/transmitted light. So putting a polarizer in front of the event-sensor 14 and then changing the polarization axis shows all surfaces within a field of view that change light polarization—some appearing darker and some brighter. This technique can also enable object detection, by indicating objects with certain material properties or at a particular orientation with respect to the camera.

In any case, where there is a preference to receive more image information in response to triggering the actuator 18, a polarization layer may be preferred, whereas where cleaner edge information is preferred, then mechanically changing the state of the lens assembly 12 or the relative alignment of the lens assembly 12 and event-sensor 14 may be preferred.

Note that in some embodiments a single linear polarization layer may be employed, whereas in others, more than one such polarization layer could be employed with the axis of one layer being orthogonal to the other. In this case, the processor 16 could choose to successively adjust the axis of polarization of each layer to obtain alternative image information for the scene which could then be combined or selected as required.

In other embodiments, a circular polarisation layer could be employed and again the axis of polarization of such a layer could be adjusted to provide image information across the field of view of the camera.

Finally, while the above described embodiments have concentrated on monochrome intensity images, it will be appreciated that the principles of those embodiments can be extended to the colour domain. Indeed in some embodiments, as an alternative or in addition to a polarization layer or indeed mechanically changing the state of the lens assembly 12 or the relative alignment of the lens assembly 12 and event-sensor 14, one or more actuable colour filter layers could be provided in the light path anywhere between the front surface of the lens assembly 12 and the imaging surface of the event-sensor 14.

Such filter(s) when actuated could change the transmissivity along the light path of light of a given colour to therefore cause the required change in light intensity for pixels distributed across the event sensor 14.

It will be appreciated that embodiments of the present invention enable an event-sensor based camera, especially one installed in a fixed location, to see not only moving objects within a field of view, but also static background.

The exact pattern of events generated by triggering the actuator 18 is not critical, as long as it provides additional information about the scene. Changing the light field through for example, changing focal length or changing the axis of rotation of a circular polarizer or rotation of the lens assembly 12 and event-sensor 14 relative to one another around the optical axis will tend to maximize change towards the periphery of the event-sensor. On the other hand, shifting the lens assembly 12 and event-sensor 14 relative to one another in a direction orthogonal to the optical axis will tend to highlight edges running in one direction. For example, shifting horizontally will tend to highlight vertical edges with horizontal edges generating very few events. As such, it may be desirable to be able to shift the lens assembly 12 and event-sensor 14 relative to one another in orthogonal directions to pick up on both types of edges.

In still further variations, multiple different types of the above described exemplary actuators or other actuators could be combined to enable the event-sensor 14 to generate different forms of image information as required by a downstream processor 16.

The invention claimed is:

1. A camera comprising a lens assembly coupled to an event-sensor, the lens assembly being configured to focus a light field onto a surface of the event-sensor, said surface of the event-sensor comprising a plurality of light sensitive-pixels, each of which cause an event to be generated when there is a change in light intensity greater than a threshold amount incident on said light sensitive-pixels, the camera further including a first actuator which can be triggered to cause a change in the light field incident on said surface of said event-sensor and to generate a set of events from a sub-set of pixels distributed across said surface of said event-sensor, wherein said first actuator is configured to move an entirety of the camera to cause the change in the light field incident on said surface of said event-sensor and to generate the set of events from the sub-set of pixels distributed across said surface of said event-sensor, and wherein the camera further comprises a processor, wherein said processor is responsive to a frequency of events being provided by said event-sensor from at least one portion of said event-sensor dropping below a threshold amount to thereby trigger said first actuator to move the entirety of the camera to cause the change in the light field incident on said surface of said event-sensor and to generate the set of events from the sub-set of pixels distributed across said surface of said event-sensor.

2. The camera according to claim 1 wherein said camera further comprises a second actuator coupling said lens assembly and said event-sensor, said second actuator being triggered to shift said lens assembly relative to said event-sensor in a direction orthogonal to an optical axis of said camera to cause said change in the light field incident on said surface of said event-sensor.

3. The camera according to claim 2 wherein said second actuator is configured when triggered to shift said lens assembly relative to said event-sensor in one of a plurality of directions orthogonal to an optical axis of said camera.

4. The camera according to claim 1 wherein said camera further comprises a second actuator and a first polarization layer disposed in a light path between a front surface of said lens assembly and said surface of said event-sensor, said second actuator being triggered to change a first axis of polarization of said first polarization layer to cause said change in the light field incident on said surface of said event-sensor.

5. The camera according to claim 4 wherein said camera further comprises a second polarization layer with a second axis of polarization orthogonal to said first axis of polarization of said first polarization layer, said second actuator being triggered to selectively change said first axis of polarization of said first polarization layer or said second polarization layer.

6. The camera according to claim 4 wherein said polarization layer comprises one of a linear polarizer or a circular polarizer.

7. The camera according to claim 1 wherein said camera further comprises a second actuator and a color filter layer disposed in a light path between a front surface of said lens assembly and said surface of said event-sensor, said second actuator being triggered to change a transmissivity of said color filter layer to cause said change in the light field incident on said surface of said event-sensor.

8. The camera according to claim 1 further comprising a plurality of actuators, each being configured when triggered to cause a different change in the light field incident on said surface of said event-sensor.

9. A system comprising a lens assembly coupled to an event-sensor, the lens assembly being configured to focus a light field onto a surface of the event-sensor, said surface of the event-sensor comprising a plurality of light sensitive-pixels, each of which cause an event to be generated when there is a change in light intensity greater than a threshold amount incident on said light sensitive-pixels, the system further including a first actuator which can be triggered to cause a change in the light field incident on said surface of said event-sensor and to generate a set of events from a sub-set of pixels distributed across said surface of said event-sensor, wherein said first actuator is configured to move an entirety of the system to cause the change in the light field incident on said surface of said event-sensor and to generate the set of events from the sub-set of pixels distributed across said surface of said event-sensor, and wherein the camera further comprises a processor, wherein said processor is responsive to a frequency of events being provided by said event-sensor from at least one portion of said event-sensor dropping below a threshold amount to thereby trigger said first actuator to move the entirety of the system to cause the change in the light field incident on said surface of said event-sensor and to generate the set of events from the sub-set of pixels distributed across said surface of said event-sensor.

10. The system according to claim 9 wherein said system further comprises a second actuator coupling said lens assembly and said event-sensor, said second actuator being triggered to shift said lens assembly relative to said event-sensor in a direction orthogonal to an optical axis of said system to cause said change in the light field incident on said surface of said event-sensor.

11. The system according to claim 10 wherein said second actuator is configured when triggered to shift said lens assembly relative to said event-sensor in one of a plurality of directions orthogonal to an optical axis of said system.

12. The system according to claim 9 wherein said system further comprises a second actuator and a first polarization layer disposed in a light path between a front surface of said lens assembly and said surface of said event-sensor, said second actuator being triggered to change a first axis of polarization of said first polarization layer to cause said change in the light field incident on said surface of said event-sensor.

13. The system according to claim 12 wherein said system further comprises a second polarization layer with a second axis of polarization orthogonal to said first axis of polarization of said first polarization layer, said second actuator being triggered to selectively change said first axis of polarization of said first polarization layer or said second polarization layer.

14. The system according to claim 12 wherein said polarization layer comprises one of a linear polarizer or a circular polarizer.

15. The system according to claim 9 wherein said system further comprises a second actuator and a color filter layer disposed in a light path between a front surface of said lens assembly and said surface of said event-sensor, said second actuator being triggered to change a transmissivity of said color filter layer to cause said change in the light field incident on said surface of said event-sensor.

16. The system according to claim 9 further comprising a plurality of actuators, each being configured when triggered to cause a different change in the light field incident on said surface of said event-sensor.

* * * * *